3,511,308
PROCESS FOR COOLING HOT GASEOUS
SUSPENSIONS OF FINE SOLIDS
Ludwig F. Nerlinger, Wilmington, Del., assignor to E. I.
du Pont de Nemours and Company, Wilmington, Del.,
a corporation of Delaware
No Drawing. Filed May 9, 1968, Ser. No. 728,060
Int. Cl. F28b 3/00
U.S. Cl. 165—1        3 Claims

ABSTRACT OF THE DISCLOSURE

The cooling efficiency of externally cooled conduits through which a hot gaseous suspension of fine solids is passed for cooling, is improved by introducing into the hot suspension a minor amount of particulate, solid, water-soluble salt and after cooling, separating the fine particles from the salt by solution of the latter. The invention is particularly directed to the cooling of pigmentary titanium dioxide suspended in hot gaseous reaction products from the oxidation of titanium tetrachloride vapor.

BACKGROUND OF THE INVENTION

There are several instances in industry where finely divided solids suspended in a hot gas are subjected to cooling by passage through conduits capable of heat exchange. Two examples of such suspension are gas black and titanium dioxide pigment. Both of these products are produced in suspension in the by-product gases from high temperature flame reaction. In the case of titanium dioxide a major part of the suspending gas is by-product chlorine. It is economically essential to recover this chlorine preferably by the dry separation of it from the pigmentary particles. This separation is carried out in cyclones or bag filters or similar devices. After recovery of by-product chlorine, the titanium dioxide is frequently slurred in water for subsequent treatment. The titanium dioxide suspensions are initially formed at quite high temperatures, for example, between 1200 and 1600° C. Due to the presence of free chlorine in this mixture, a considerable equipment corrosion problem is present. It has been found however that metal conduits constructed of nickel or aluminum are satisfactory if adequate external cooling is applied. Water cooling of the aluminum conduits has proved satisfactory. The fine titanium dioxide however has a strong tendency to deposit in adherent layers on the inner walls of the conduits. This, of course, decreases the heat transfer and unless it is removed eventually plugs the conduit with a layer of sintered pigment. Usually the ultimate remedy is to shut down the equipment and clean out the conduits, by washing with water. This, of course, necessitates a drying period after the washing and causes an expensive down time in what is otherwise continuously operating equipment.

U.S. Pat. 2,271,626 issued to C. E. Rick solves this surface coating problem by introducing relatively dense, hard abrasive particles into the hot suspension. These particles are referred to as "scrubbing" solids. The specific solids mentioned are sand, sintered particles of titanium dioxide, mullite, or refractory alumina particles. The particles range in size from ¼″ down to 100 mesh. Since such particles constitute undesired grit in the pigment product, it is necessary to remove them. When sintered titanium particles are used for scrubbing, which is preferred, they are removed by reduction to pigmentary size by grinding. This introduces additional expense and requires separate steps and equipment installation in a plant to prepare the scrubbing $TiO_2$. In U.S. Pat. 2,789,886, issued to P. B. Kraus, a unique scrubbing agent consisting of particles of solid carbon dioxide is used. This process is satisfactory in operation since the particles evaporate during the cooling process but is relatively expensive and not favored for commercial operation.

SUMMARY OF THE INVENTION

According to the present invention, particles of a water-soluble salt such as sodium chloride are used as scrubbing solids. Sodium chloride is preferred being readily available in quite pure form, but other salts, such as potassium chloride, calcium chloride, magnesium chloride, sodium sulphate, aluminum sulphate, sodium aluminate, sodium phosphate, and magnesium sulphate may be used. These salts are preferably used in anhydrous form, since introduction of moisture in such a system increases corrosion problems especially where free chlorine is present. In the case of sodium chloride, particles ranging from 100 mesh to 4 mesh or slightly larger are satisfactory. Surprisingly, the amount of salt required to maintain continuous operation in a given cooling system can be as low as about ¼ of the amount of the prior art solids such as titanium dioxide which has been used commercially. The amount will vary depending on the degree of cooling desired and the degree of adhesion to the cool wall. When cooling gas suspended $TiO_2$ from a temperature of from about 1300° C. to 200° C. by passage of the suspension through a water-cooled aluminum conduit, from 0.5% to 5.0% by weight based on total suspended solids, of salt as scrub-solids is a practical range. In the past, the action of the scrubbing solids has been considered to be one of attrition and, in the Rick patent for example, emphasis is placed on the hardness of the particles in order to achieve this action. It is, therefore, unexpected to find that sodium chloride and similar salts, which are not only much softer than the previous refractory particles but are also much less dense exhibit an improved cleaning action. While applicant does not wish to be bound by any theory of operation, the cleaning action of salt may involve cations derived from the salt acting to prevent adhesion between the $TiO_2$ and the cooling walls; or the lower density of the salt may contribute to its better suspension throughout the flues, thereby permitting it to contact all surfaces. It is also expected that, due to the softness and lower density of the salt particles, abrasion and wear of the conduit walls, particularly one constructed of aluminum, will be lessened.

The following example is cited to illustrate the invention. It is not intended to limit it in any manner.

Example

This example illustrates the use of sodium chloride as compared with granular $TiO_2$ in a test run in plant scale equipment. Horizontal cooling flues immersed in a shallow tank of water are used. Gas velocity in the flues is about 200 ft./second and the flow is turbulent. The titanium dioxide pigment, produced by reaction between titanium tetrachloride vapor and oxygen-enriched air is made at about 6,000 lbs./hr. In a control portion of the run, sintered $TiO_2$ particles are used as scrub solids at a rate of 200 lbs./hr. and are added intermittently by gravity from a hopper through a star valve. The star valve is operated in a manner to keep the flue exit temperatures between 150° C. and 175° C., the solids being added at intervals of from 2 to 5 minutes. The pigment and scrub solids are discharged from the cooler to a cyclone and then a bag filter to separate the gases. The solids are then slurried in water for treatment with 2% precipitated silica and 4.4% of precipitated alumina after which the slurry is filtered, washed, dried, and fluid energy milled prior to evaluation of the pigment properties. Following the control run, commercial sodium chloride of the type used to regenerate water softening zeolite is substituted for the $TiO_2$ scrub solid. The temperature is controlled in the same manner and the product collected in a separate slurry tank for finishing in the same manner. The salt, about 5 mesh, is added first at 200 lbs./hr. but during the run it is found that this can be reduced to 80 lbs./hr. to maintain the same cooling capacity. Microscopic examination of samples of the cooler discharge show that the salt crystals had fractured, i.e. become smaller, but had retained the characteristic sharp cornered cubic shape. The two finished pigments are found to have substantially the same whiteness, hiding power, and oil absorption. The salt scrubbed pigment however is lower in +325 mesh in-process grit than the control by a factor of about 14, specifically, .024% vs. .341%. An unexpected benefit associated with salt use is an increased filtering and washing rate for the wet treated slurry. Due to this better filtering and washing, the filter cake is found to have a specific electrical resistance of 7.20 ohms/sq. cm. as compared with 6.2 ohms/sq. centimeter for the control. This resistivity test is used as a measure of the soluble salts present in the pigment. The higher resistance indicates the more desirable lower salt content. A further unexpected advantage observed during this test is about a 35% decrease in the pressure drop across the bag filter.

The marked difference in physical properties of the scrubbing solids of this invention as compared with those of the prior art is set forth in the following table.

TABLE I

| Agent | M.P. (° C) | Sp. Gr. | Moh hardness | Sol. in $H_2O$, grams/ 100 grams |
|---|---|---|---|---|
| $TiO_2$ (rutile) | 1,640 | 4.26 | 6.–6.5 | Insol |
| $SiO_2$ | 1,670 | 2.65 | 6–7 | Insol. |
| Mullite | 1,900 | 3.03 | 7.5 | Insol. |
| Alumina | 2,000 | 4.00 | 9 | Insol. |
| NaCl | 800.4 | 2.16 | 2 | *36–39 |
| KCl | 776 | 1.99 | 2 | 4-1/2-77 |
| $CaCl_2$ | 772 | 2.15 | | 59–347 |
| $MgCl_2$ | 708 | 2.3 | soft | 53–73 |
| $Na_2SO_4$ | 884 | 2.5 | est. <5 | .5–42 |
| $Al_2(SO)_3$ | 770 | 2.7 | est. <5 | 31–89 |
| $NaAlO_2$ | 1,650 | | est. <5 | V. sol. |
| $Na_3PO_4$ | 1,340 | 2.53 | est. <5 | 4.5–777 |
| $MgSO_4$ | 1,185 | 2.66 | est. <5 | 27–68 |

* First figure cold water, second figure hot water.

Since most of the titanium dioxide pigment prepared by the vapor phase oxidation method is subsequently slurried in water for various treatments, there is no problem relative to the separation of the soluble salts. They are removed by the normal wet processing without any additional step. In case aluminum salts are found feasible in relation to subsequent steps, they can remain in the wet process solution and be utilized in the usual treatment with precipitated alumina at a significant savings. The specific quantity of a salt used for a given amount of pigment may vary. In the case of 5 mesh sodium chloride for example from 15 to 150 lbs./hr. of salt is a satisfactory range for treating a $TiO_2$ production rate of about 3 tons/hr. It is desirable and probably essential that the flow rate of the gas suspension is such that turbulent flow exists in order to keep the salt particles in suspension and effective in cleaning all parts of the surface. Under these conditions it has been found that, even though the hot gaseous suspension is several hundred degrees hotter than the melting point of the salt, the cooling action is apparently so fast that no problem arises due to melting of the salt.

The salt particles may be added continuously or intermittently near the hot end of the cooling conduit. The required amount and frequency of addition may be estimated and controlled during operation by monitoring the temperature of the suspension leaving the cooler. As soon as an appreciable rise in temperature occurs for a fixed reaction temperature and production rate, the presence of wall deposits is suspected and salt is added or the rate of addition increased.

Various forms of heat exchangers characterized as conduits or flues and externally cooled, preferably by water, are used in the process of this invention. One such water-cooled system in which the internal gaseous pressure is maintained above the hydrostatic pressure of the cooling water in order to prevent inflow of the water in the event of a leak is described in U.S. Pat. 2,833,627. A simple method of cooling such flues is to position them horizontally in a shallow pool or tank. Usually sufficient length of cooling duct is provided to cool the suspension to 300° C. or lower depending upon the method by which the by-product chlorine is separated from the solid pigment. Cyclone separation is satisfactory at temperatures 300° C. and below and may be followed by bag filters after further cooling, or, the ducts can be long enough to reduce temperature to that which may be handled by suitable filter means. After separation of the pigmentary solids, the by-product chlorine is recycled to the process and the pigment is wet treated and the salt dissolved out.

In the case of pigmentary $TiO_2$ the cooled solids are slurried in water for removal of the salt by solution. This step is advantageously combined with well-known wet treatment processes such as precipitation of hydrous oxides in the pigment slurry. During this treatment, which is normally followed by filtration and washing, the salt is removed at no added cost. The hydrous oxide treatments referred to include precipitation in the slurry of hydrous oxides of silicon, aluminum, titanium, zirconium, zinc and the like.

Many equivalent modifications will become apparent to those skilled in the art from a reading of the above without a departure from the inventive concept.

I claim:

1. In a process for cooling a hot suspension of fine solids in a gas wherein said suspension is passed through an externally cooled conduit, the improvement comprising introducing into said hot suspension a minor amount of a particulate, anhydrous, water-soluble salt having a melting point above about 700° C. and a hardness on the Mohr scale not greater than about 5, subsequent to cooling said suspension, separating said salt from the fine solids by dissolving said salt and recovering the fine solids.

2. The process of claim 1 wherein the said fine solids consist essentially of $TiO_2$.

3. The process of claim 2 wherein the said salt is sodium chloride.

References Cited

UNITED STATES PATENTS 3,433,594   3/1969   Wilson et al. _____ 23—202

ROBERT A. O'LEARY, Primary Examiner

C. SUKALO, Assistant Examiner

U.S. Cl. X.R.

23—202